US010896697B2

(12) United States Patent
Sumiya et al.

(10) Patent No.: US 10,896,697 B2
(45) Date of Patent: Jan. 19, 2021

(54) RECORDING TAPE CARTRIDGE STORAGE CASE AND STORAGE CASE CONTAINING RECORDING TAPE CARTRIDGES

(71) Applicant: FUJIFILM CORPORATION, Tokyo (JP)

(72) Inventors: Yosuke Sumiya, Kanagawa (JP); Yusuke Kagawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/357,327

(22) Filed: Mar. 19, 2019

(65) Prior Publication Data

US 2019/0295599 A1    Sep. 26, 2019

(30) Foreign Application Priority Data

Mar. 26, 2018    (JP) ................................. 2018-059002

(51) Int. Cl.
    *G11B 33/02*    (2006.01)
    *G11B 33/04*    (2006.01)
    *B65D 85/671*   (2006.01)

(52) U.S. Cl.
    CPC .......... *G11B 33/022* (2013.01); *B65D 85/671* (2013.01); *G11B 33/04* (2013.01)

(58) Field of Classification Search
    CPC .... B65D 85/30; B65D 85/575; B65D 85/671; B65D 85/672; G11B 33/02; G11B 33/022; G11B 33/04; G11B 33/00
    USPC .......... 206/387.1–387.15; 220/508, 518, 520
    See application file for complete search history.

(56) References Cited

U.S. PATENT DOCUMENTS

| | | | | | |
|---|---|---|---|---|---|
| 3,674,132 | A | * | 7/1972 | Loss ..................... | B65D 25/107 206/387.15 |
| 3,756,383 | A | * | 9/1973 | Kryter .................... | B65D 25/10 206/387.14 |
| 4,003,468 | A | * | 1/1977 | Berkman ........... | G11B 23/0236 206/307.1 |
| 4,040,518 | A | * | 8/1977 | Carter .................. | B65D 25/107 206/387.15 |
| 4,117,931 | A | * | 10/1978 | Berkman ........... | G11B 23/0236 206/387.14 |

(Continued)

FOREIGN PATENT DOCUMENTS

| | | | | |
|---|---|---|---|---|
| EP | 0528507 A2 | * | 2/1993 | ......... G11B 23/0236 |
| JP | 2007-197081 A | | 8/2007 | |
| JP | 2007-204083 A | | 8/2007 | |

*Primary Examiner* — Bryon P Gehman
(74) *Attorney, Agent, or Firm* — Solaris Intellectual Property Group, PLLC (57) ABSTRACT

A recording tape cartridge storage case includes a case body made of resin having a bottom plate that is rectangular in a bottom view and a peripheral wall erected from a peripheral edge of the bottom plate, a plurality of recording tape cartridges being stored in at least two rows with label areas thereof directed upward, respectively, and a bottom rib interposed between mutually adjacent side surfaces of the recording tape cartridges that form the rows being formed on the bottom plate; and a lid member made of resin that is attached to an upper end of the peripheral wall, seals the case body, and has a top rib interposed between the side surfaces, transmission parts that are transparent flat surfaces being formed in portions that face the label areas on both sides of the top rib.

10 Claims, 7 Drawing Sheets

(56) References Cited

U.S. PATENT DOCUMENTS

| | | | | |
|---|---|---|---|---|
| 4,201,298 A | * | 5/1980 | Larson | B65D 25/04 |
| | | | | 206/387.14 |
| 4,339,162 A | * | 7/1982 | Gelardi | G11B 23/023 |
| | | | | 312/9.21 |
| 4,432,453 A | * | 2/1984 | Berkman | G11B 23/0236 |
| | | | | 206/387.14 |
| 4,595,098 A | * | 6/1986 | Kryter | G11B 23/0236 |
| | | | | 206/387.14 |
| 4,629,066 A | * | 12/1986 | Howard | G11B 23/0236 |
| | | | | 190/110 |
| 4,744,463 A | * | 5/1988 | Merzon | G11B 23/0236 |
| | | | | 206/387.14 |
| 4,896,769 A | * | 1/1990 | Merzon | G11B 23/0236 |
| | | | | 206/232 |
| 5,012,928 A | * | 5/1991 | Proffitt | B65D 21/0233 |
| | | | | 206/508 |
| 5,285,900 A | * | 2/1994 | Swingler | B65D 25/005 |
| | | | | 206/508 |
| 6,640,972 B2 | * | 11/2003 | Morita | G11B 33/0455 |
| | | | | 206/387.14 |
| 8,800,773 B2 | * | 8/2014 | Inugai | B65D 77/0413 |
| | | | | 206/307 |
| 2007/0175779 A1 | * | 8/2007 | Imai | B65D 11/188 |
| | | | | 206/308.3 |
| 2009/0078603 A1 | * | 3/2009 | Imai | G11B 23/0236 |
| | | | | 206/387.15 |

* cited by examiner

RECORDING TAPE CARTRIDGE STORAGE CASE AND STORAGE CASE CONTAINING RECORDING TAPE CARTRIDGES

CROSS-REFERENCE TO RELATED APPLICATION

This application claims priority under 35 USC 119 from Japanese Patent Application No. 2018-059002 filed Mar. 26, 2018, the disclosure of which is incorporated by reference herein.

BACKGROUND OF THE INVENTION

Field of the Invention

The present disclosure relates to a recording tape cartridge storage case and a storage case containing recording tape cartridges.

Description of the Related Art

Two types of magnetic tape cartridge storage cases (hereinafter simply referred to as "storage cases") for a single cartridge or twenty cartridges are mainly present. As the storage cases for twenty cartridges, those in which an upper case and a lower case made of the resin that are vacuum-molded products are used from viewpoints of low cost, the excellent quality of products, and opening easiness (for example, refer to JP2007-204083A). Since complicated rib shapes are formed in such storage cases, the storage cases themselves have no region where a product identification information label of a defined size (90 mm×140 mm) is affixed without any distortion.

Hence, such storage cases are enclosed in cardboard boxes and delivered in order to stick product identification information labels of the defined size thereon (for example, refer to JP2007-197081A). In other words, it is difficult to deliver such storage cases without being enclosed with the cardboard boxes. Accordingly, various rib structures have been suggested and put in practical use such that further rib shapes based on packaging forms to the cardboard boxes are formed on the storage cases.

SUMMARY OF THE INVENTION

Meanwhile, individual identification information labels (bar codes labels) in which bar codes readable by a reader machine (bar code reader) and character strings readable by viewing are printed are affixed to label areas formed on rear surfaces of recording tape cartridges, respectively. By reading the bar codes or character strings printed on the individual identification information labels, management of the individual recording tape cartridges can be performed.

However, the storage cases have complicated rib shapes as described above. For that reason, from the outside of each storage case, it is difficult to read the bar codes printed on the individual identification information labels of the recording tape cartridges stored within the storage case by the reader machine, or to read the character strings by viewing.

Hence, when a desired recording tape cartridge is searched for from the plurality of recording tape cartridges stored within the storage case, it is necessary to open the storage case each time (remove the upper case from the lower case), and the work of searching for the desired recording tape cartridge is very complicated and inconvenient work.

Thus, an object of the present disclosure is to obtain a recording tape cartridge storage case and a storage case containing recording tape cartridges capable of visually recognition of label areas of recording tape cartridges from the outside.

In order obtain the above object, a recording tape cartridge storage case related to the present disclosure comprises a case body made of resin having a bottom plate that is rectangular in a bottom view and a peripheral wall erected from a peripheral edge of the bottom plate, a plurality of recording tape cartridges being stored in at least two rows with label areas thereof directed upward, respectively, and a bottom rib interposed between mutually adjacent side surfaces of the recording tape cartridges that form the rows being formed on the bottom plate; and a lid member made of resin that is attached to an upper end of the peripheral wall, seals the case body, and has a top rib interposed between the side surfaces, transmission parts that are transparent flat surfaces being formed in portions that face the label areas on both sides of the top rib.

Additionally, a storage case containing recording tape cartridges related to the present disclosure comprises the above recording tape cartridge storage case; and a plurality of recording tape cartridges that are stored in at least two rows within the recording tape cartridge storage case such that label areas thereof are directed upward.

According to the present disclosure, the label areas of the recording tape cartridges can be visually recognized from the outside by the transmission parts.

DESCRIPTION OF THE PREFERRED EMBODIMENTS

Hereinafter, embodiments related to the present disclosure will be described in detail with reference to the drawings. In addition, for convenience of description, arrow UP illustrated in the respective drawings is defined as an upward direction of a recording tape cartridge storage case (hereinafter simply referred to as a "storage case") 10. Additionally, although arrow FR is defined as a forward direction (front side) of the storage case 10, a direction opposite to the forward direction is defined as a backward direction (back side), and arrow RH is defined as a rightward direction of the storage case 10, the forward and backward directions and rightward and leftward directions are not limited to those illustrated.

Figure 7:
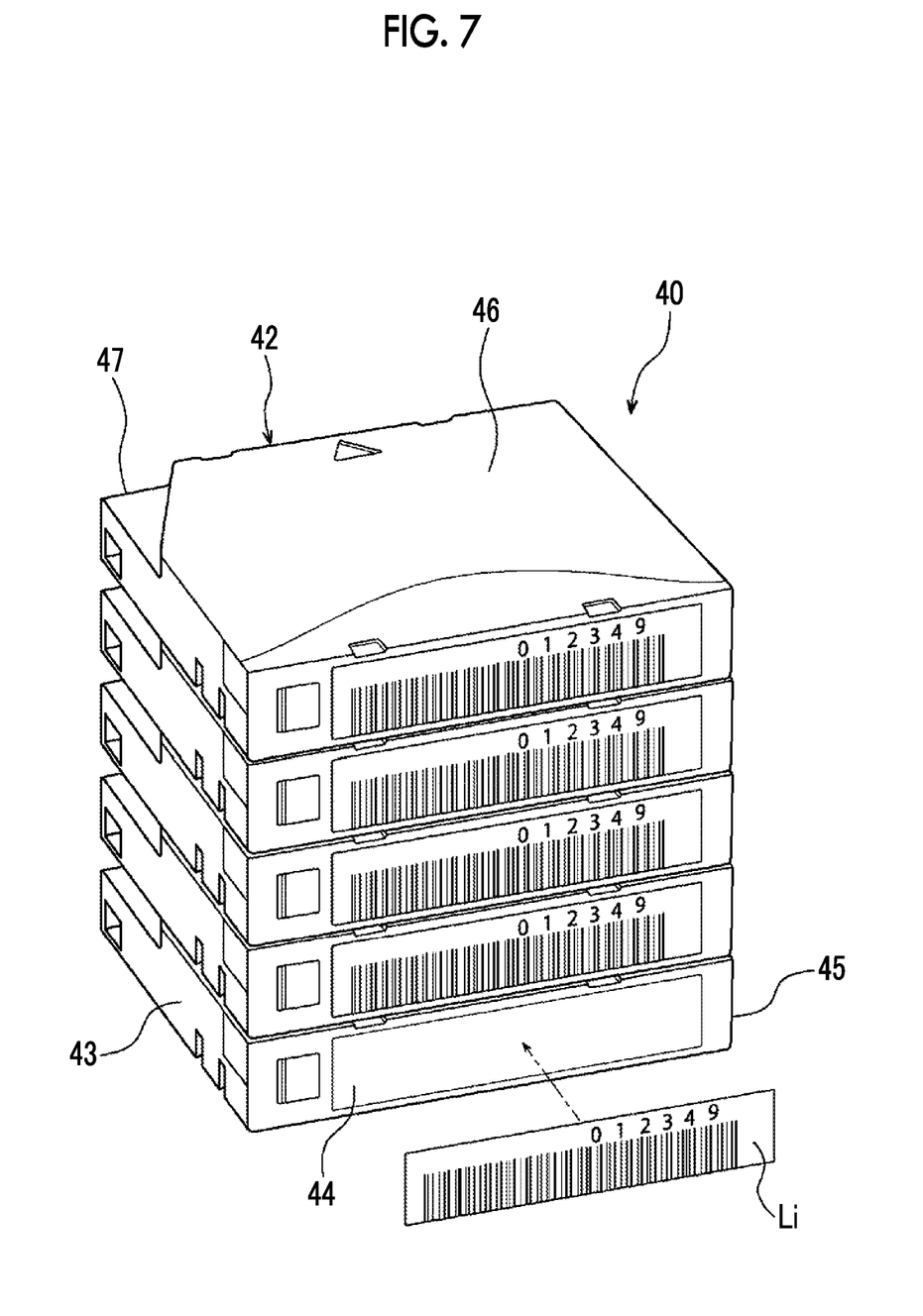
FIG. 7 is a perspective view illustrating rear surfaces of the recording tape cartridges stored in the recording tape cartridge storage case related to the present embodiment.

Additionally, as illustrated in FIG. 7, a recording tape cartridge 40 is mainly used for data backup of computers or the like, and is configured such that a single reel (not illustrated) around which recording tapes (not illustrated), such as magnetic tape, is wound is stored within a flat rectangular parallelepiped-shaped case 42. When data is recorded on a recording tape or the data recorded on the recording tape is read, a drive device (not illustrated) is loaded into the recording tape cartridge 40, and the recording tape is pulled out from the inside of the case 42.

In addition, the dimensions of the case 42 are defined in Japanese Industrial Standard (JIS X6175). Specifically, the length (length along a loading direction to a drive device) of the case 42 is 102.00 mm±0.30 mm, the width of the case 42 is 105.40 mm±0.30 mm, and the height (thickness) of the case 42 is 21.50 mm±0.25 mm. Additionally, the size of a product identification information label Lp to be affixed to the storage case 10 is also defined as 90 mm in length×140 mm in width.

Figure 1:
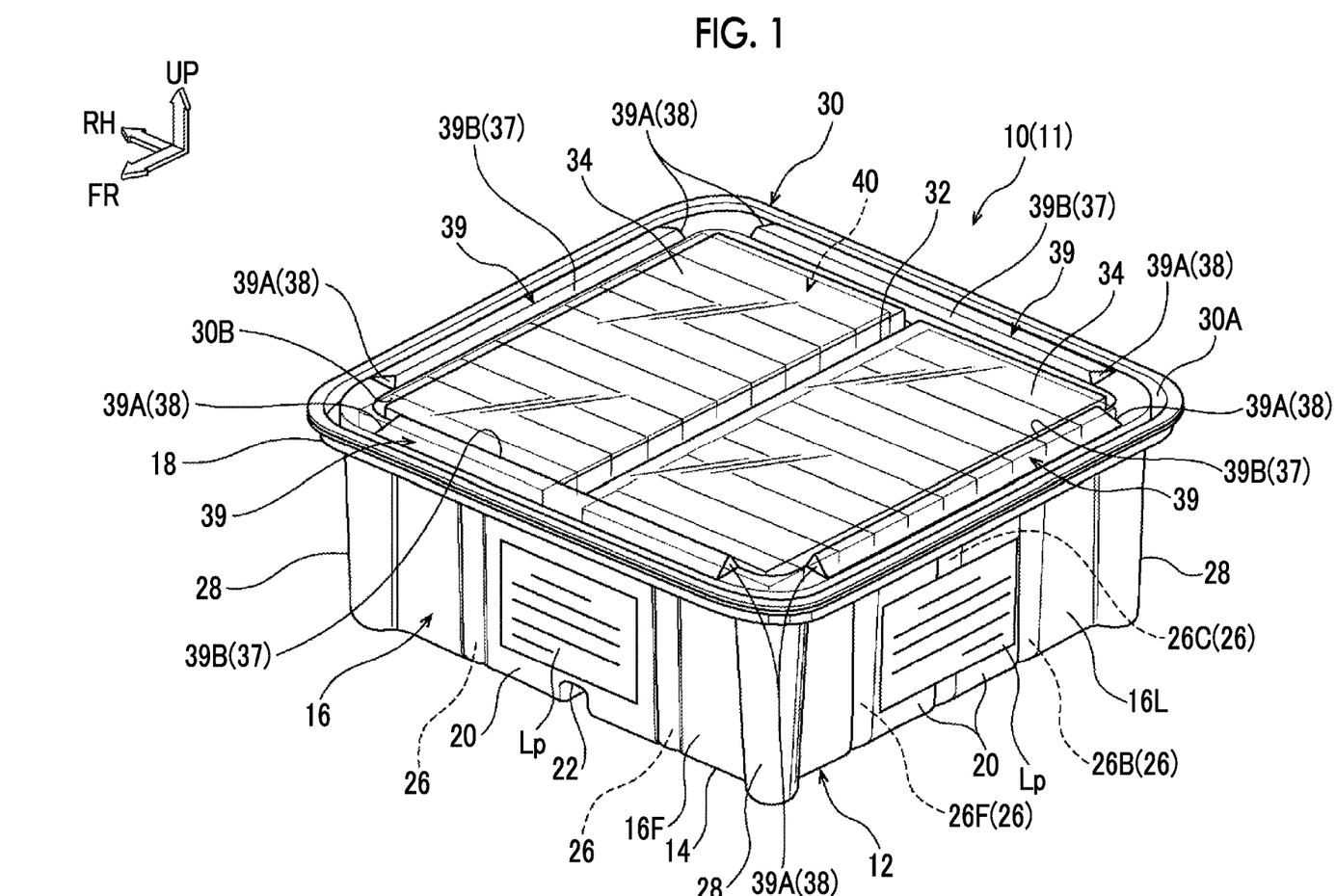
FIG. 1 is a perspective view illustrating a storage case containing recording tape cartridges related to the present embodiment.
Figure 2:
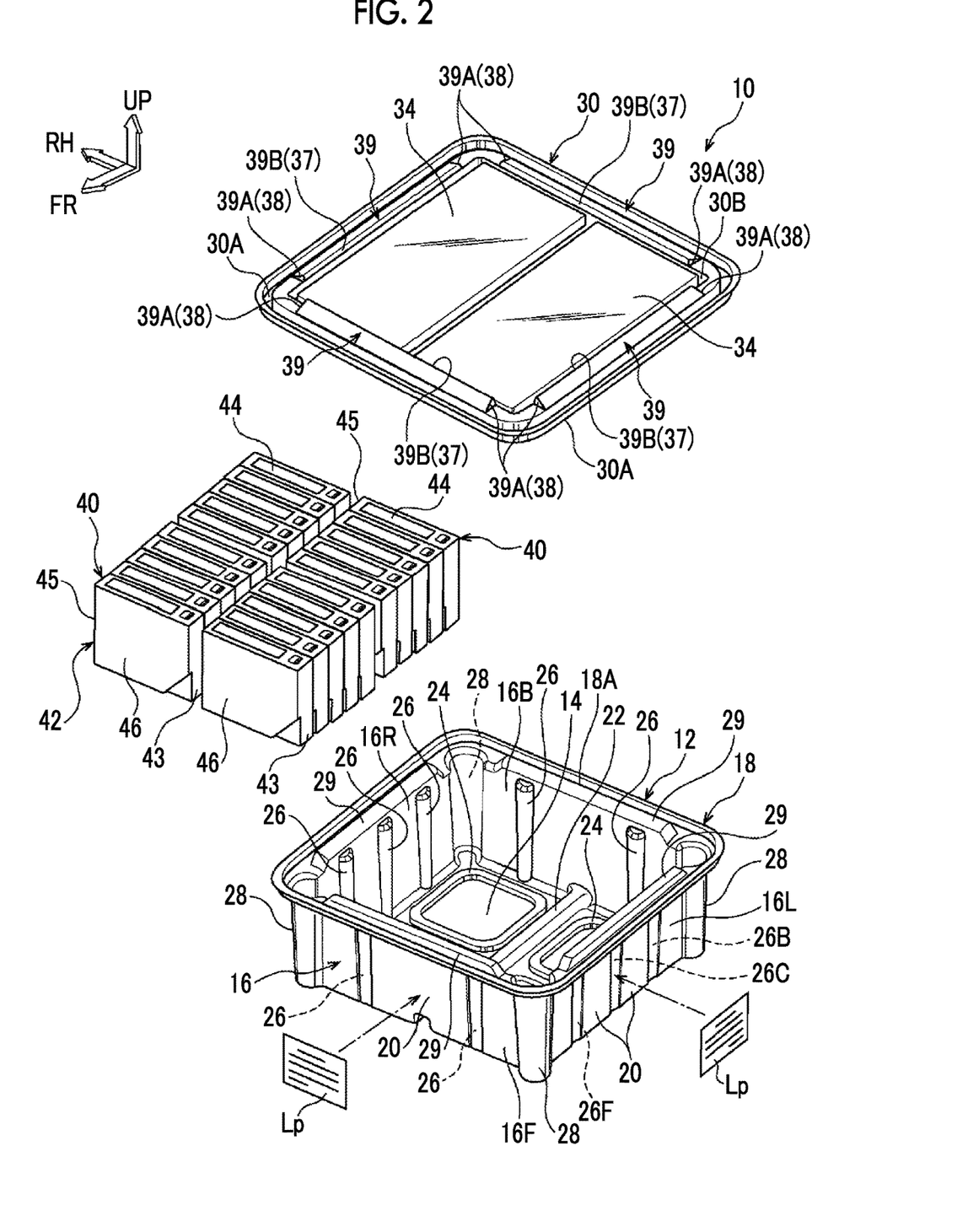
FIG. 2 is an exploded perspective view illustrating a case body and a lid member, which constitute the recording tape cartridge storage case related to the present embodiment, together with the recording tape cartridges.

Additionally, as illustrated in FIG. 1 and FIG. 2, a plurality of the recording tape cartridges 40 are stored in at least two rows within the storage case 10. In the present embodiment, a total of 20 cartridges in two rows, 10 cartridges in each row, are stored. In addition, a storage case 10 in which a recording tape cartridge 40 is stored is defined as a storage case 11 containing recording tape cartridges in a case where the storage cartridge 10 is distinguished from a storage case 10 where no recording tape cartridge 40 is stored.

As illustrated in FIG. 1 and FIG. 2, the storage case 10 related to the present embodiment is constituted of a case body 12 made of resin, and a lid member 30 made of resin. In addition, the case body 12 and the lid member 30 are formed, for example, by vacuum forming of resin materials, such as polypropylene (PP), polystyrene (PS), polyethylene terephthalate (PET), and polycarbonate (PC). However, resin materials for molding the case body 12 and the lid member 30 are not limited to the above resin materials.

Figure 3:
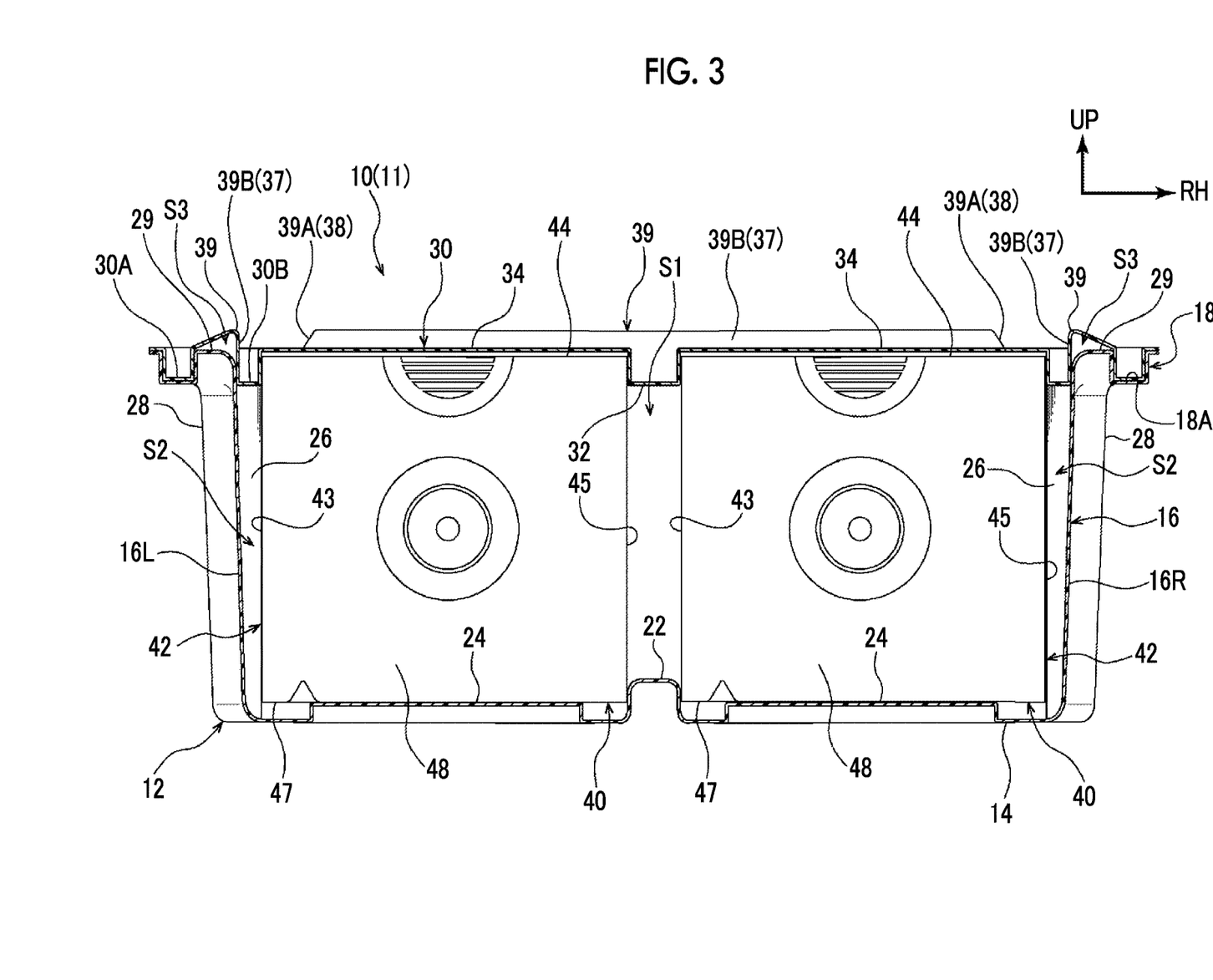
FIG. 3 is a side view illustrating the storage case containing recording tape cartridges related to the present embodiment.

As illustrated in FIGS. 1 to 3, the case body 12 has a bottom plate 14 that is rectangular in a bottom view, and a rectangular peripheral wall 16 erected from a peripheral edge of the bottom plate 14. The twenty recording tape cartridges 40 are stored within the case body 12 such that label areas 44 (also refer to FIG. 7) formed on rear surfaces thereof are directed upward (toward an opening side of the case body 12) and so as to be arranged in two rows with almost no gap in a thickness direction of the case 42.

As illustrated in FIG. 2 and FIG. 3, a bottom rib 22, which is interposed between mutually adjacent side surfaces of the recording tape cartridges 40 that form the rows, that is, between right side surfaces 45 that are one side surfaces and left side surfaces 43 that are the other side surfaces, is formed on the bottom plate 14. As a central part of the bottom plate 14 in a leftward-rightward direction protrudes in an inverted "U" shape toward the upper side, the bottom rib 22 is formed such that a forward-rearward direction is a longitudinal direction.

In other words, the bottom rib 22 is continuously linearly formed from one side of the front and rear opposite sides to the other side of the bottom plate 14 (from a front wall 16F to a rear wall 16B to be described below) in a bottom view. The bottom rib 22 overlaps respective lower parts of the mutually adjacent right side surfaces 45 and left side surfaces 43 of the recording tape cartridges 40 that form the rows in a side view (refer to FIG. 3). A gap S1 for allowing fingers to be inserted thereinto is formed by the bottom rib 22 between the mutually adjacent right side surfaces 45 and left side surfaces 43 of the recording tape cartridges 40 that form the rows.

Additionally, support ribs 24 that support every five stored recording tape cartridges 40 are formed by protruding in a rectangular frame shape upward from the bottom plate 14 on both sides of the bottom rib 22. That is, a total of four support ribs 24, two supporting ribs on each side, are formed forward and rearward on both sides of the bottom rib 22, and every five recording tape cartridges 40 are disposed on each support rib 24 in a state where front surfaces 47 (refer to FIG. 3) thereof are directed downward (a state where the label areas 44 are directed upward).

Additionally, as illustrated in FIGS. 1 to 3, the peripheral wall 16 is constituted of the front wall 16F, the rear wall 16B, a left side wall 16L, and a right side wall 16R. A plurality of protruding ribs 26, which have an upward-downward direction as the longitudinal direction, protrude toward the inside of the case body 12, and are substantially semicircular in a plan view, are formed in portions of the mutually facing front wall 16F and rear wall 16B of the peripheral wall 16 and portions of the mutually facing left side wall 16L and right side wall 16R.

Specifically, two protruding ribs 26 extending over the entire height of each wall are curvedly formed at predetermined intervals in the leftward-rightward direction on each of the front wall 16F and the rear wall 16B, respectively. The two protruding ribs 26 formed on the front wall 16F protrude toward respective top surfaces 46 (also refer to FIG. 7) of heads of the recording tape cartridges 40 that form the rows, and the two protruding ribs 26 formed on the rear wall 16B protrude toward respective bottom surfaces 48 (refer to FIG. 3) of ends of the recording tape cartridges 40 that form the rows.

Additionally, three protruding ribs 26 extending over the entire height of each side wall are curvedly formed at predetermined intervals in the forward-rearward direction on each of the left side wall 16L and the right side wall 16R. The three protruding ribs 26 formed on the left side wall 16L protrude toward respective left side surfaces 43 of the recording tape cartridges 40 that form the rows, and the three protruding ribs 26 formed on the right side wall 16R protrude toward respective right side surfaces 45 of the recording tape cartridges 40 that form the rows.

A flat region 20 (refer to FIG. 2) to which a product identification information label Lp can be affixed is formed between the protruding ribs 26 (a portion in which no protruding rib 26 is formed) on an outer surface of the front wall 16F (peripheral wall 16). Additionally, a flat region 20 (refer to FIG. 2) to which a product identification information label Lp can be affixed is formed between protruding ribs 26F and 26B spaced apart from each other in the forward-rearward direction on an outer surface of the left side wall 16L so as to straddle a central protruding rib 26C.

Figure 5:
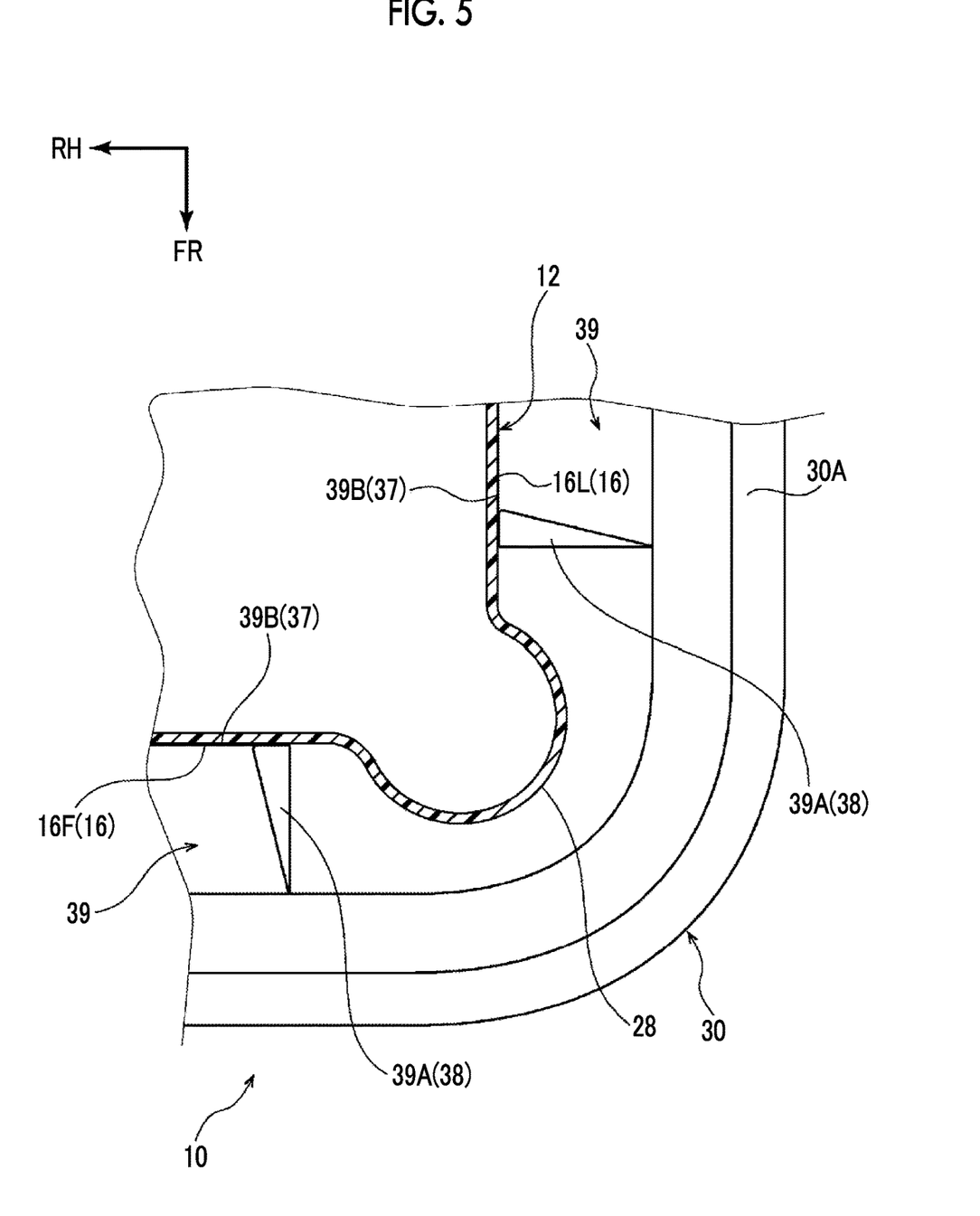
FIG. 5 is an enlarged plan view illustrating a restricting part and an engaging part of the recording tape cartridge storage case related to the present embodiment.

Additionally, engaging parts 28, which protrude outward (in an outward direction along a stacking surface to be described below), are formed integrally with respective corner parts (four corners) of the case body 12 (peripheral wall 16). As illustrated in FIG. 5, each engaging part 28 is formed in a substantially circular-arc shape in a plan view (or a bottom view), and the position there is restricted by a restricting part 38 (to be described below) in another lid member 30 on which the case body 12 is put. In addition, the engaging part 28 also functions also as, for example, a buffer part when the storage case 10 is dropped.

Figure 6:
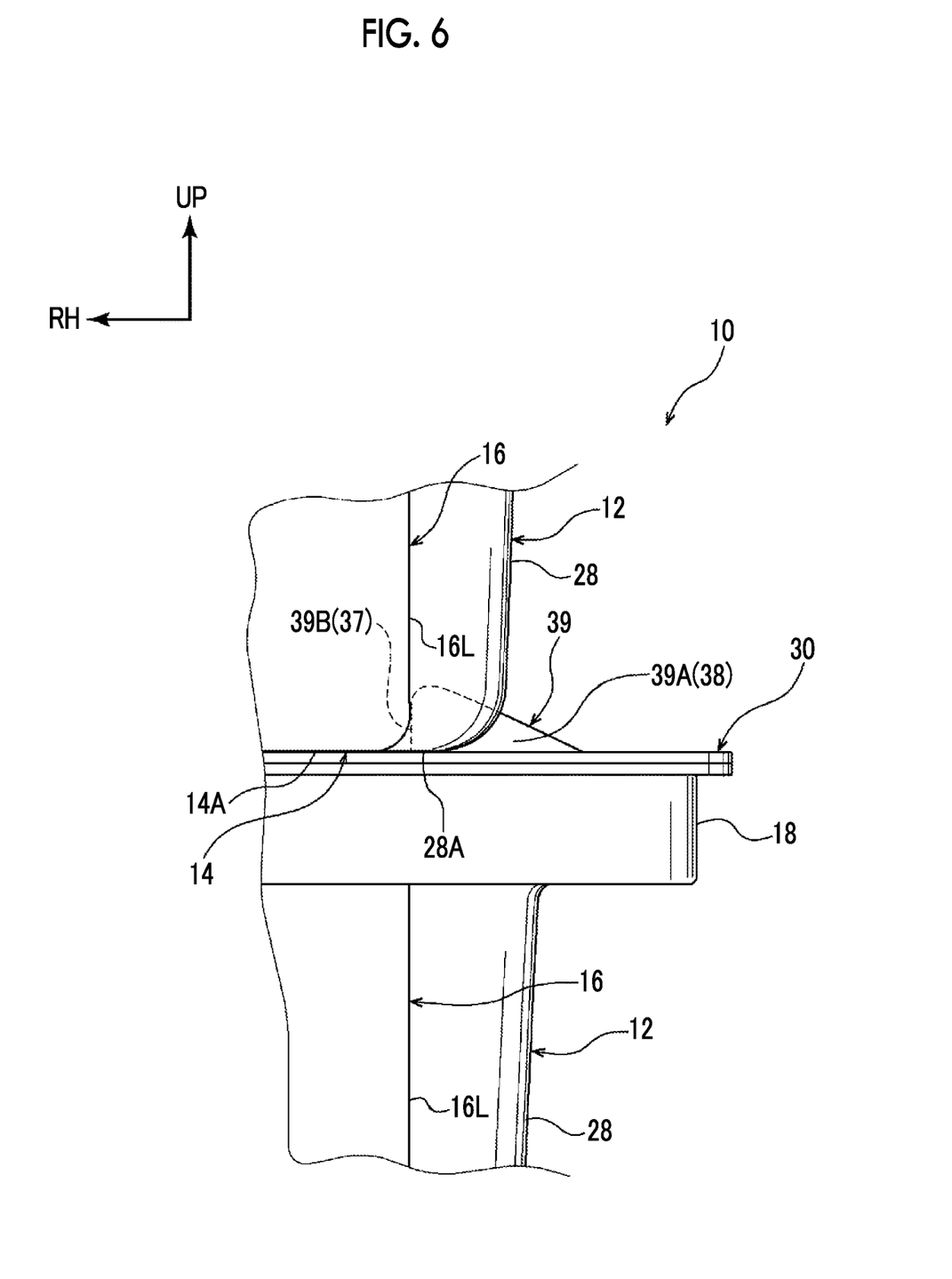
FIG. 6 is an enlarged side view illustrating the restricting part and the engaging part of the recording tape cartridge storage case related to the present embodiment.

Additionally, as illustrated in FIG. 6, a lower surface 28A of each engaging part 28 is configured so as not to protrude downward from a lower surface 14A of the bottom plate 14 that becomes a stacking surface of the case body 12 with respect to the above-described other lid member 30. More specifically, the lower surface 28A of each engaging part 28 is configured so as to be flush with the lower surface 14A of the bottom plate 14 of the case body 12 with respect to the above-described other lid member 30.

Additionally, as illustrated in FIG. 2 and FIG. 3, an overhanging part 18 that overhangs outward is integrally formed over the entire circumference at an upper end of the peripheral wall 16. A recessed groove part 18A, which is recessed downward along an outer peripheral edge of the overhanging part 18, is curvedly formed at the outer peripheral edge of the overhanging part 18. Additionally, a protruding strip part 29, which protrudes upward except for respective corner parts in a side view and has a substantially rectangular shape, is integrally formed at an inner peripheral edge of the overhanging part 18. An outer wall of the protruding strip part 29 constitutes an inner wall of the recessed groove part 18A.

As illustrated in FIGS. 1 to 4, the lid member 30 seals the case body 12 by being attached to an upper end of the peripheral wall 16. Specifically, a protruding part 30A, which protrudes downward along an outer peripheral edge of the lid member 30, is curvedly formed at an outer peripheral edge of the lid member 30. A protruding part 30B, which protrudes downward along the outer peripheral edge with the same height as that of the protruding part 30A, is also curvedly formed on an inner side of the protruding part 30A.

Hence, the lid member 30 is disposed in a state where the inner protruding part 30B is in contact with an inner peripheral edge of the protruding strip part 29 in the case body 12 from the inside, and the outer protruding part 30A is attached to the case body 12 by being fitted into the recessed groove part 18A from above so as to seal the case body 12.

In addition, in a case where the recording tape cartridges 40 are stored within the case body 12, the inner protruding part 30B is fitted between the respective top surfaces 46 of the heads, the respective bottom surfaces 48 of the ends, the respective right side surfaces 45, the respective left side surfaces 43 in the recording tape cartridges 40 that form the rows, and the inner peripheral edge of the protruding strip part 29 (into gaps S2 formed by the protruding ribs 26) from above (refer to FIG. 3).

Additionally, a protruding strip part 39, which has a substantially right-angled triangle in a side view of which a right-angled portion is located on an inner lower side along the outer peripheral edge of the lid member 30, is integrally formed in regions excluding the respective corner parts between the protruding part 30A and the protruding part 30B of the lid member 30. A vertical surface 39B (also refer to FIG. 6) of the protruding strip part 39, which faces an inward side, becomes a restricting part 37 that restricts the position of the peripheral wall 16 in the other case body 12 stacked top. An end surface 39A of the protruding strip part 39, which faces the longitudinal direction, becomes the restricting part 38 that restricts the position of the engaging part 28 in the other case body 12 stacked top.

That is, any positional deviation of the other case body 12 stacked on the lid member 30 is suppressed by the restricting part 37 (vertical surface 39B) and the restricting part 38 (end surface 39A). Additionally, as is illustrated in FIG. 3, the protruding strip part 39 is configured so as to face the protruding strip part 29 in the case body 12 with a gap S3 therefrom in the upward-downward direction, and is configured so as not to be directly fitted to the protruding strip part 29.

Moreover, the lid member 30 has a top rib 32 interposed between the mutually adjacent side surfaces of the recording tape cartridges 40 that form the rows, that is, between the right side surfaces 45 that are one side surfaces and the left side surfaces 43 that are the other side surface when the case body 12 is sealed. Specifically, as illustrated in FIG. 3, as a central part of the lid member 30 in the leftward-rightward direction protrudes in a "U" shape downward, the top rib 32 is formed such that the forward-rearward direction is the longitudinal direction.

Figure 4:
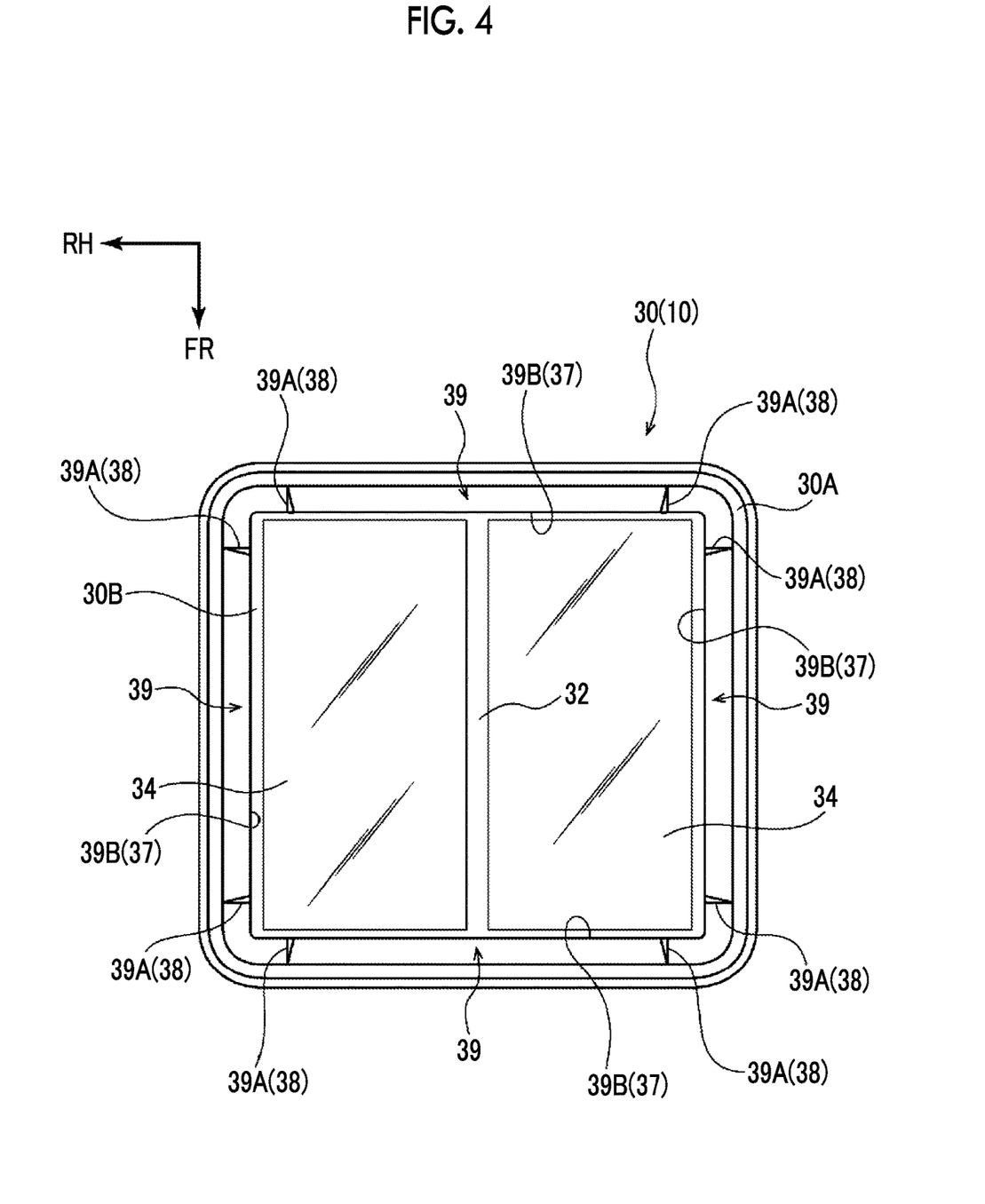
FIG. 4 is a plan view of the lid member that constitutes the recording tape cartridge storage case related to the present embodiment.

In other words, the top rib 32 is formed in a linear shape that is continuous from one side of opposite sides to the other side (from the protruding part 30B on the front side to the protruding part 30B on the rear side) of the lid member 30 in a plan view illustrated in FIG. 4. Additionally, the protruding height of the top rib 32 is made to be substantially equal to the protruding height of the protruding part 30A and the protruding part 30B (refer to FIG. 3). Accordingly, the top rib 32 overlaps respective upper parts of the mutually adjacent right side surfaces 45 and left side surfaces 43 of the recording tape cartridges 40 that form the rows in a side view.

Additionally, as illustrated in FIGS. 1 to 4, transmission parts 34, which are rectangular flat surfaces on which the forward-rearward direction is the longitudinal direction in a plan view and are made transparent, are formed in portions of the lid member 30 that face the label areas 44 of the stored recording tape cartridges 40 on both sides of the top rib 32 on an inner side of the protruding part 30B.

Each transmission part 34 faces the label areas 44 substantially with no gap in the upward-downward direction w (refer to FIG. 3), and is adapted to be capable of visually recognize the label areas 44 through the transmission part 34 from the outside (upper side). Accordingly, bar codes printed on an individual identification information label Li (refer to FIG. 7) described below can be read by a reader machine (bar code reader), or character strings (numbers or the like) printed on the individual identification information label Li can be read by viewing.

As illustrated in FIG. 7, the individual identification information label Li is affixed to the label area 44 of a recording tape cartridge 40 by a user. That is, the recording tape cartridge 40 stored within the storage case 10 is again stored and kept within the storage case 10 after the recording tape cartridge 40 is taken out from the inside of the storage case 10 by the user and the individual identification information label Li is affixed thereon.

The operation of the storage case 10 having the configuration as described above will be described next.

In a case where the plurality of (every five cartridges in one set and twenty cartridges in four sets) recording tape cartridges 40 are stored within the storage case 10 at the time of forwarding, the respective recording tape cartridges 40 are disposed on the four support ribs 24 of the bottom plate 14. That is, the respective recording tape cartridges 40 are aligned in two rows and stored such that the label areas 44 are directed upward (the front surfaces 47 are directed downward) and the thickness direction of the case 42 is directed in the forward-rearward direction.

The storage case 10 is sealed by attaching the lid member 30 to the upper end of the peripheral wall 16 of the case body 12. That is, the protruding part 30A formed at the outer peripheral edge of the lid member 30 is fitted into the recessed groove part 18A formed in the overhanging part 18 of the case body 12 from above.

The protruding part 30B formed closer to the inner side than the protruding part 30A of the lid member 30 is fitted between the inner peripheral edge of the protruding strip part 29 of the case body 12, and the respective top surfaces 46 of the heads, the respective bottom surfaces 48 of the ends, the respective right side surfaces 45, the respective left side surfaces 43 in the recording tape cartridges 40 that form the rows (into the gaps S2 formed by the protruding ribs 26), from above.

Additionally, the top rib 32 in the lid member 30 enters between the mutually adjacent right side surfaces 45 and left side surfaces 43 of the recording tape cartridges 40 that form the rows (gap S1 formed by the bottom rib 22) from above. That is, the top rib 32 and the bottom rib 22 that are formed in a linear shape that is continuous in the forward-rearward direction (from one side to the other side) enters between the right side surfaces 45 and the left side surfaces 43, and face the upward-downward direction.

As described above, even in a case where the recording tape cartridges 40 that form the rows are held by the storage case 10, and for example, the storage case 10 is lifted with a diagonal corner part serving of the overhanging part 18 gripped, generation of distortion in the storage case 10 can be suppressed or prevented by the bottom rib 22 and the top rib 32.

In this way, the product identification information labels Lp are affixed to the storage case 10 in which the recording tape cartridges 40 are enclosed, that is, the storage case 11 containing recording tape cartridges. Specifically, the product identification information label Lp is affixed to the flat region 20 formed on the outer surface of the front wall 16F (peripheral wall 16) of the case body 12, and the product identification information label Lp is affixed to the flat region 20 formed on the outer surface of the left side wall 16L (peripheral wall 16) of the case body 12.

In this way, the flat regions 20 to which the product identification information labels Lp are affixed are formed on the outer surface (particularly the portion of the outer surface on which no protruding rib 26 is formed) of the peripheral wall 16 of the case body 12. Thus, for example, compared to a case where a product identification information label Lp is affixed to an outer surface of a peripheral wall (not illustrated) in which a complicated rib shape is formed, the product identification information label Lp can be affixed to the outer surface of the peripheral wall 16 of the case body 12 without distortion, and peeling thereof from the outer surface of the peripheral wall 16 can be suppressed or prevented.

The storage case 11 (storage case 10) containing recording tape cartridges to which the product identification information label Lp is affixed is forwarded as it is, and is delivered to a user for the recording tape cartridges 40. That is, it is not necessary to enclose the storage case 11 (storage case 10) containing recording tape cartridges with a cardboard box. Hence, the work for enclosing the storage case 11 in the cardboard box and the cost taken for the cardboard box can be made unnecessary.

In the storage case 10, it is unnecessary to form a complicated rib shape based on a packaging form to the cardboard box, the shape of a mold that molds the storage case 10 (the case body 12 and the lid member 30) can be simplified, and the manufacturing cost of the storage case 10 itself can also be reduced. Additionally, even the user for the recording tape cartridges 40 is released from the complicated work of taking out the storage case 11 (storage case 10) containing recording tape cartridges from the cardboard box.

In a case where data is recorded on a recording tape cartridges 40, the user takes out the recording tape cartridge 40 from the inside of the storage case 10. That is, the lid member 30 is first detached from the case body 12. Here, the bottom rib 22 interposed between the mutually adjacent right side surfaces 45 and left side surfaces 43 of the recording tape cartridges 40 that form the rows is formed on the bottom plate 14. Hence, the gap S1 for allowing fingers to be inserted thereinto is formed between the mutually adjacent right side surfaces 45 and left side surfaces 43 of the recording tape cartridges 40 that form the rows.

Additionally, the plurality of protruding ribs 26 are formed on the peripheral wall 16 of the case body 12, and the gaps S2 for allowing fingers to be inserted thereinto is formed by the protruding ribs 26 also between the respective top surfaces 46 of the heads, the respective bottom surfaces 48 of the ends, the respective right side surfaces 45, the respective left side surfaces 43 in the recording tape cartridges 40 that form the rows and the inner surface of the peripheral wall 16, respectively. For that reason, when a recording tape cartridges 40 is taken out from the inside of the case body 12, the right side surfaces 45 and the left side surfaces 43 of the recording tape cartridge 40 can be easily gripped with fingers and can be easily taken out.

Before the recording tape cartridge 40 taken out from the inside of the case body 12 in this way is loaded into a drive device capable of recording (and reproducing) the data, an individual identification information label Li is affixed to the label area 44 formed on the rear surface of the case 42 (refer to FIG. 7). Then, the recording tape cartridge 40, to which the individual identification information label Li is affixed, is loaded into the drive device, and the data are recorded on a recording tape pulled out of the case 42. In addition, the individual identification information label Li may be affixed after the data is recorded on the recording tape cartridge 40 (recording tape).

The recording tape cartridge 40, which has the data recorded on the recording tape and taken out from the drive device, is again returned (stored) into the case body 12 by the user such that the individual identification information label Li is directed upward (the front surface 47 is directed downward). Then, the case body 12 is sealed by the lid member 30.

That is, the protruding part 30A of the lid member 30 is fitted into the recessed groove part 18A formed in the overhanging part 18 of the case body 12 from above. Then, the protruding part 30B of the lid member 30 is fitted between the inner peripheral edge of the protruding strip part 29 of the case body 12, and the respective top surfaces 46 of the heads, the respective bottom surfaces 48 of the ends, the respective right side surfaces 45, the respective left side surfaces 43 in the recording tape cartridges 40 that form the rows (the gaps S2 formed by the protruding ribs 26), from above. In this way, the lid member 30 has a re-sealable configuration.

Here, the transmission parts 34 that are transparent flat surfaces are formed in the lid member 30 that faces the label areas 44 of the recording tape cartridges 40. Here, the individual identification information labels Li affixed to the label areas 44 of the recording tape cartridges 40 stored within the case body 12 can be viewed from the outside of the lid member 30 by the transmission parts 34.

That is, even in a case where a recording tape cartridge 40 is not taken out from the inside of the storage case 10, the bar codes of the individual identification information label Li affixed to the label area 44 of the recording tape cartridge can be read by the reader machine (bar code reader), and the user can read the character strings of the individual identification information label Li by viewing. Therefore, a desired recording tape cartridge 40 can be searched for from the outside of the storage case 10, and the recording tape cartridge 40 can be efficiently managed.

In addition, the individual identification information labels Li may be affixed to the label areas 44 of the recording tape cartridges 40 before being delivered to a user. That is, the recording tape cartridges 40 on that the individual identification information labels Li are affixed to the label area 44 in advance are enclosed and forwarded to the storage case 10. Additionally, the product identification information labels Lp are also affixed to the flat regions 20 of the case body 12 before the recording tape cartridges 40 are stored.

Additionally, in the storage case 10, at least the transmission parts 34 of the lid member 30 may be transparent, and the portions of the lid member 30 excluding the transmission parts 34 and the case body 12 may not be transparent. Additionally, the height of the peripheral wall 16 in the case body 12 is appropriately determined depending on the size of the product identification information label Lp of the defined size (90 mm×140 mm) to be affixed to each flat region 20.

Additionally, the protruding strip part 39 extending along the peripheral edge of the lid member 30 is formed at the peripheral edge of the lid member 30 excluding the corner parts, and the vertical surface 39B of the protruding strip part 39 is used as the restricting part 37 that restricts the position of the peripheral wall 16 of the other case body 12 stacked on the lid member 30. The end surface 39A of the protruding strip part 39, which faces the longitudinal direction, is used as the restricting part 38 that restricts the position of each engaging part 28 in the other case body 12 stacked on the lid member 30.

In other words, the case body 12 has the peripheral wall 16 of the position is restricted by the restricting part 37 (vertical surface 39B) in the other lid member 30 on which the case body 12 is put, and has the engaging parts 28 of which the positions are restricted by the restricting parts 38 (end surfaces 39A) in the other lid member 30 on which the case body 12 is put. Hence, when the other storage case 10 is stacked on the storage case 10, any relative deviation of the positions of both the storage cases can be effectively suppressed.

In addition, each engaging part 28 is configured so as not to protrude downward from the lower surface 14A of the bottom plate 14 of the case body 12 with respect to the other above-described lid member 30. In other words, this engaging part 28 is configured so as to be flush with the lower surface 14A of the bottom plate 14 of the case body 12 with respect to the above-described other lid member 30.

Hence, in a case where the engaging part 28 is configured so as to protrude downward from the lower surface 14A of the bottom plate 14 of the case body 12 with respect to the above-described other lid member 30, the case body 12 can be stacked on the above-described other lid member 30 in a further stabilized state. Additionally, the shape of the mold that molds the case body 12 can be further simplified.

Additionally, the engaging part 28 protrudes outward along the lower surface 14A of the bottom plate 14 from each corner part of the case body 12. Hence, even in a case where the storage case 10 is dropped, the engaging part 28 can function as a buffer part, and damage, plastic deformation, or the like of the storage case 10 can be suppressed or prevented.

Additionally, the restricting part 38 that restricts the position of the engaging part 28 is constituted of the end surface 39A of the protruding strip part 39 that faces the longitudinal direction. Hence, the configuration of the restricting part 38 for the engaging part 28 can be simplified, and it is possible to suppress a situation in which the shape of the lid member 30 is complicated. That is, in a case where such a configuration is adopted, the shape of the mold that molds the lid member 30 can be further simplified, and the manufacturing cost of the storage case 10 including the lid member 30 and the case body 12 can be further reduced.

As described above, although the storage case 10 and the storage case 11 containing recording tape cartridges related to the present embodiment have been described with reference to the drawings, the storage case 10 and the storage case 11 containing recording tape cartridges related to the present embodiment are not limited to the illustrated ones. Design changes can be appropriately made without departing from the concept of the invention.

For example, the bottom rib 22 and the top rib 32 are not limited to the continuous linear shape, and may have an intermittent linear shape. Additionally, the shape of the protruding strip part 39 is not limited to the substantially right-angled triangle in the illustrated side view, and the shape of the engaging part 28 is not limited to the substantially circular-arc shape in the illustrated plan view (or bottom view).

Additionally, as long as the product identification information label Lp is affixed, the height of the peripheral wall 16 may be made lower than the illustrated one. In this case, a peripheral wall (not illustrated) of a predetermined height may be formed around each transmission part 34 in the lid member 30 so that rear parts of the recording tape cartridges 40 protruding from the opening of the case body 12 can be stored by the lid member 30.

Additionally, although the storage case 10 related to the present embodiment is formed with a size such that the twenty recording tape cartridges 40 is stored, the size of the storage case 10 is not limited to this. That is, the storage case 10 may be formed, for example, with a size such that three or more rows of recording tape cartridges 40, every ten recording tape cartridges forming each row, are stored.

What is claimed is:

1. A recording tape cartridge storage case comprising:
   a case body made of resin having a bottom plate that is rectangular in a bottom view and a peripheral wall erected from a peripheral edge of the bottom plate, a plurality of recording tape cartridges being stored in at least two rows with label areas thereof directed upward, respectively, and a bottom rib interposed between mutually adjacent side surfaces of the recording tape cartridges that form the rows on the bottom plate; and
   a lid member made of resin that is attached to an upper end of the peripheral wall, seals the case body, and has a top rib interposed between the side surfaces, transmission parts that are transparent flat surfaces being formed in portions that face the label areas on both sides of the top rib;
   wherein protruding ribs, which protrude toward the side surfaces of the recording tape cartridges that form the rows, are formed on mutually facing portions of the peripheral wall;
   the lid member comprises restricting parts that restrict a position of another case body stacked thereon;

the case body comprises an engaging part of which a position is restricted by the restricting parts in another said lid member;

a lower surface of the engaging part is configured so as not to protrude downward from a lower surface of the bottom plate;

a respective protruding strip part extending along each peripheral edge of the lid member, each respective protruding strip part being formed at the peripheral edge of the lid member excluding a corner part of the peripheral edge, and each restricting part is an end surface of one respective protruding strip part that faces a longitudinal direction of the protruding strip part; and each protruding strip part has a substantially right-angled triangle shape in side view.

2. The recording tape cartridge storage case according to claim 1, wherein a flat region where a product identification information label is capable of being affixed is formed on an outer surface of the peripheral wall.

3. The recording tape cartridge storage case according to claim 1, wherein a flat region where a product identification information label is capable of being affixed is formed on a portion in which the protruding ribs are not formed, on an outer surface of the peripheral wall.

4. The recording tape cartridge storage case according to claim 1, wherein the bottom rib is formed in a linear shape and is formed continuously between the mutually adjacent side surfaces.

5. The recording tape cartridge storage case according to claim 1, wherein the top rib is formed in a linear shape and formed continuously between the mutually adjacent side surfaces.

6. The recording tape cartridge storage case according to claim 1, wherein the engaging part is configured so as to be flush with a stacking surface of the case body with respect to the other lid member.

7. The recording tape cartridge storage case according to claim 1, wherein the engaging part protrudes in a direction extending along a stacking surface from a corner part of the case body.

8. A storage case and recording tape cartridges combination, comprising:

the recording tape cartridge storage case according to claim 1; and a plurality of recording tape cartridges that are stored in at least two rows within the recording tape cartridge storage case such that label areas thereof are directed upward.

9. The storage case and recording tape cartridges combination according to claim 8, wherein an individual identification information label is affixed to each of the label areas.

10. The storage case and recording tape cartridges combination according to claim 8, wherein a product identification information label is affixed to a flat region formed on an outer surface of the peripheral wall in the recording tape cartridge storage case.

* * * * *